Patented May 5, 1925.

1,536,301

UNITED STATES PATENT OFFICE.

OTTO LOWY, OF NEWARK, NEW JERSEY, ASSIGNOR, BY MESNE ASSIGNMENTS, TO TECHNICAL PRODUCTS CORPORATION, A CORPORATION OF NEW JERSEY.

PROPHYLATIC DETERGENT.

No Drawing. Application filed August 30, 1920. Serial No. 407,027.

*To all whom it may concern:*

Be it known that I, OTTO LOWY, a citizen of the United States, and a resident of the city of Newark, Essex County, State of New Jersey, have invented an Improvement in Prophylactic Detergents, of which the following is a specification.

My invention relates to prophylactic substances, especially substances which are in the form of soaps or detergents which are particularly adapted to avoid contagion by such diseases as syphilis, gonorrhea, and the like. It is an object of the present invention to provide a prophylactic soap or detergent of the character specified, which shall have unusual spirochætacidal and gonococcicidal powers, and which shall, at the same time, be convenient, safe and easy to use.

By way of example, I shall in the accompanying specification describe an illustrative embodiment of the product of my invention, it being understood that my invention is not limited to the illustrative embodiment thereof herein set forth for purposes of illustration only.

In preparing the product of the present invention, I provide a carrier which is preferably in the form of a soap, which may be either hard, soft, liquid or of a pasty consistency, and which is adapted to protect the spirochætacidal substance from excessive contact with the air. I have discovered that such carriers are very satisfactory for the present purpose, suitably protecting the spirochætacidal substance from excessive oxidation, while at the same time avoiding any undesirable chemical reaction with such substance.

For the spirochætacidal substance I prefer to use a derivative of arseno-benzol, preferably diamino-dioxy-arseno-benzol or arsphenamine. Assuming, for example, the use of arsphenamine, I may employ this material either in the form of the base, or the acid salt or dihydrochloride, or in the form of the mono-sodium or di-sodium salts of this compound of arsenic. More particularly, I prefer to employ "spoiled," that is, partly, or wholly, oxidized derivatives of arsphenamine or diamino-dioxy-arseno-benzol which are too toxic to enable them to be used with safety for injection, but which I have discovered possess unexpectedly powerful spirochætacidal powers when applied externally.

While various proportions of arsenical compounds and carriers may be employed, I prefer to use a product consisting of about ½ to about 5 per cent of arsenical compound to about 99½ to about 95 per cent of carrier. The two materials are intimately mixed with the carrier so as to provide a uniform mixture. In this way the carrier will act to protect the arsenical compound from excessive oxidation, the oxidation occurring principally on the outer surfaces of the mixture and gradually but slowly spreading inwardly. It is deemed desirable to limit the degree of oxidation and, accordingly, the spirochætacidal powers of the substance of the present invention, since otherwise the substance may become too poisonous and too irritating to permit its ready application to mucous or other sensitive surfaces which it is desired to protect from contagion.

Instead of using any of the above arsenical compounds directly, I may employ the same in the form of laked blood or a serum, which I may prepare by the following respective methods:

In preparing laked blood containing an arsenical compound, which fluid I find possesses increased spirochætacidal powers but without too great toxicity, I inject an animal with a maximum dose of arsphenamine in the form of a solution of the dihydrochloride, or of the mono-sodium or di-sodium salts. After about five minutes the animal is bled, and the blood laked by means of a solution of acetic acid in distilled water. The desired amount of this material is now added to the carrier, preferably in an amount from about 1 to about 10 per cent of laked blood to about 99 to about 90 per cent of the carrier. In order to prevent coagulation of the blood, it may be desirable to add any desired amount of potassium oxalate or sodium citrate to the blood, after which the same is laked by the solution of acetic acid in distilled water, as already described.

Instead of laked blood I may employ a spirochætacidal serum, which may be prepared by injecting an animal with a maximum dose of arsphenamine in the form of a solution of the dihydrochloride, or acid salt, or of the mono-sodium or di-sodium salts. The animal is now bled, the blood coagulated and the serum thus obtained used in an amount from about 1 per cent to about 10 per cent, for about 99 to about 90 per cent of the carrier. I have discovered that the serum or laked blood obtained as above described possesses unusual and unexpected spirochætacidal powers, while being less toxic or poisonous than might otherwise be expected.

I may also employ as the spirochætacidal substance a blood serum formed by bleeding an animal and then coagulating the blood, to which serum may then be added an arsenical compound, such as arsphenamine in the form of the base, the dihydrochloride or acid salt, or the mono-sodium or di-sodium salts, and then adding to the carrier from about 1 to about 10 per cent by weight of such arsenical serum.

To the spirochætacidal paste or jelly thus produced, I may add from about $\frac{1}{10}$ per cent to about 5 per cent of argyrol, which gives the substance additional prophylactic and gonococcicidal properties without adversely affecting the same, and without causing any undesirable chemical reaction between argyrol and the other constituents of the prophylactic substance.

The prophylactic soaps or detergents prepared as above may be safely and readily used by surgeons, physicians or others, on the hands or other parts of the body which it is desired to protect from contagion, and will be found to possess great spirochætacidal powers, without, however, causing any undesirable irritation of the membranes on which the soap may be used. Where, as already set forth above, the spirochætacidal substance consists of an arsenical laked blood or serum, it will be found for this reason to possess unexpectedly powerful spirochætacidal properties, without being toxic or poisonous to the degree which might be anticipated in view of its great spirochætacidal powers.

It is of course to be understood that my invention is not limited to the particular form thereof herein described for purposes of illustration only.

What I claim is:

1. A prophylactic detergent comprising a soap containing oxidized arsphenamine.

2. A prophylactic detergent comprising an intimate mixture of a soap and an arsphenamine bearing serum.

3. A prophylactic detergent comprising an intimate mixture of a soap and an oxidized arsphenamine bearing serum.

In testimony whereof, I have signed my name to this specification this 19th day of August, 1920.

OTTO LOWY.